United States Patent

Milewski

[15] 3,646,650
[45] Mar. 7, 1972

[54] MILLING CUTTER CONSTRUCTION
[72] Inventor: Victor Milewski, Troy, Mich.
[73] Assignee: The Valeron Corporation
[22] Filed: Dec. 30, 1969
[21] Appl. No.: 889,170

[52] U.S. Cl. ............................................29/105, 29/103 A
[51] Int. Cl. .........................................................B26d 1/12
[58] Field of Search .....................29/103, 103 A, 105, 105 A

[56] References Cited

UNITED STATES PATENTS 3,380,137  4/1968  MacPetrie ..............................29/103
3,125,799  3/1964  Bennett ..................................29/105

FOREIGN PATENTS OR APPLICATIONS 20,795  2/1961  Germany ..............................29/105 A Primary Examiner—Harrison L. Hinson
Attorney—Farley, Forster & Farley

[57] ABSTRACT

An end mill that uses a pair of flat sided diametrically opposed throwaway cutting inserts and is made by cutting a slot opening comparable to the thickness of inserts used, through the end of a shank member and then fixing a slightly thinner anvil locator centrally within the slot opening to provide insert receptive pockets on relatively opposite sides of the tool shank while still retaining a clevis space to be closed by a cross screw to clamp and hold the inserts in place.

9 Claims, 6 Drawing Figures

PATENTED MAR 7 1972                  3,646,650
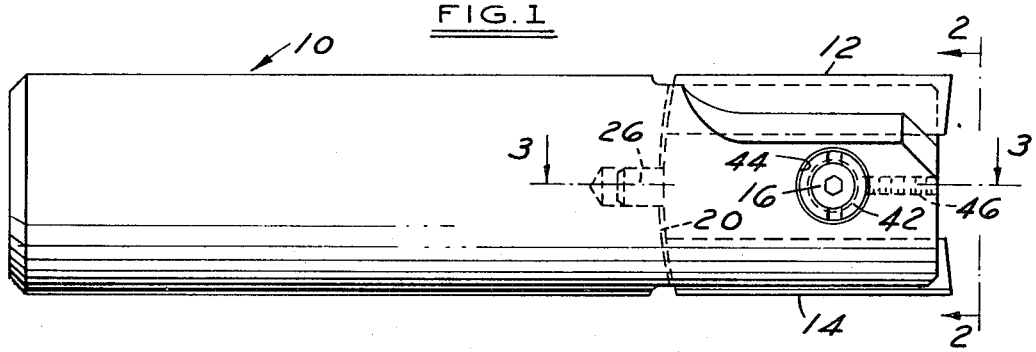
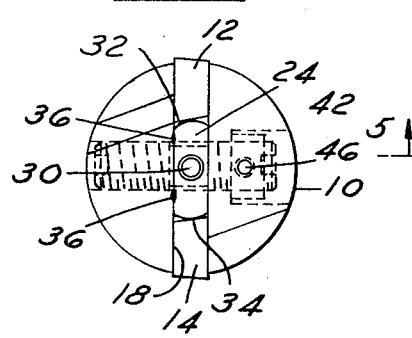
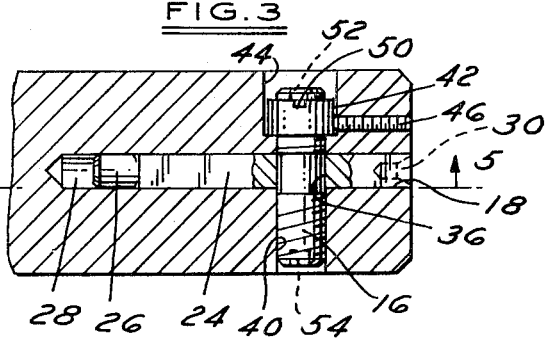
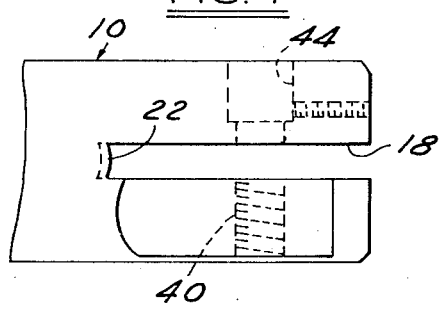
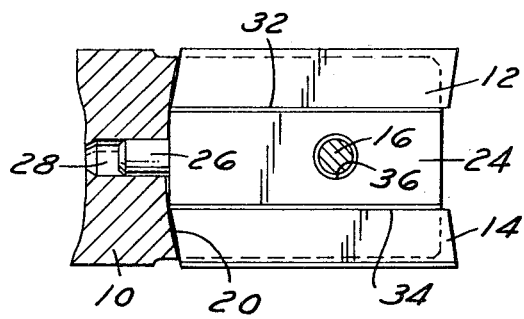
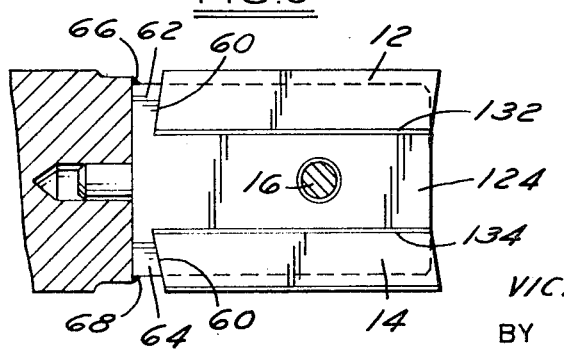
INVENTOR
VICTOR MILEWSKI
BY
Farley, Forster + Farley
ATTORNEYS

MILLING CUTTER CONSTRUCTION

BACKGROUND OF THE INVENTION

U.S. Pat. No. 3,380,137 is directed to a small diameter end mill with a cross screw to close a clevis slot and hold two separate cutting inserts on diametrically opposite sides of the tool head.

In such tool, axially extending cylindrical recesses for the inserts are cut separately and a saw kerf is provided between them to serve as the clevis slot. By loosening the clamping screw, the inserts can be changed or otherwise adjusted and when tightened the single fastener holds the throwaway inserts secure.

Because of its one-piece construction, desirable chip clearance space and exceptionally good blade (insert) support, to mention only a few features, this tool has received wide acceptance. As a consequence, consideration has now been given to improvements in construction relative to methods of manufacture for such tooling for better tolerance and cost control in production volumes.

SUMMARY OF THE INVENTION

The present invention is directed to an improvement in the construction of small diameter end mills, and most particularly to facilitate their manufacture.

A through slot, the thickness of the cutting inserts to be used, is provided through the end of a tool shank member and an anvil seat is located centrally therewithin to provide separate insert seats on diametrically opposite sides thereof. The anvil seat is tack-welded or otherwise fixed to only one side of the through slot and thereby retains the clevis opening or passage transversely through the tool shank.

Greater control of concentricity in the location of the inserts is possible in this construction since relatively simple true centering of the anvil seat at the time of tack welding accurately controls the location of both cutting inserts without any necessary tolerance allowance for machining runout.

Radiused side edges of the anvil seat member provide reference line contact with a nonwear surface of the inserts assuring positive location of both new and indexed inserts. At the same time, tolerance problems in matching the edge wall form of the inserts themselves is avoided.

Axial positioning of the inserts may be obtained by direct end wall engagement in their respective slots, radiused as necessary to accommodate any end rake angle clearances they have; or, the registering end walls for the inserts may be provided by an alternate form of anvil having projections at the inner end extending radially outward for insert end engagement.

The alternate design mentioned also provides an opportunity for peripheral location and tack-welding of the anvil at its inner disposed end.

IN THE DRAWINGS

FIG. 1 is a side elevation of a two-flute end mill including the features of this invention;

FIG. 2 is an end view as seen in the plane of line 2—2 in the first drawing figure;

FIG. 3 is a cross-sectional view taken in the plane of line 3—3 in the first drawing figure, and showing the clamp screw used;

FIG. 4 is a top plan view of the head end of the tool shown in FIG. 1, with the inserts and center anvil seat removed;

FIG. 5 is a cross-sectional view taken in the plane of line 5—5 in FIG. 3, showing the anvil seat and inserts in position.

FIG. 6 is a cross-sectional view similar to FIG. 5 showing an alternate form of anvil seating member.

DESCRIPTION OF THE ILLUSTRATED EMBODIMENT

The end mill cutter 10 is of a two-flute design, having two separate throwaway cutting inserts 12 and 14, provided in receptive pockets on diametrically opposite sides thereof. It is also of one-piece construction, having no separate wedges or clamps and uses a cross screw 16 transversely across and between the two inserts to close their respective pocket areas and clamp the inserts therewithin.

Instead of providing separately machined insert pockets on either side of the tool shank, one through opening 18 is cut across the end of the shank as best shown in FIG. 4. The thickness of the opening as machined provides a bare free fit clearance for the inserts to be received therein and it is formed with a radius of curvature 20 at its inner end (see FIGS. 1 and 5), as well as a camber 22, both of which serve a purpose that will be described later.

Within the through opening 18 is provided a preformed and sized member 24 that serves as an anvil or longitudinal seat for each of the inserts by being centrally located and fixed therein for such purpose. It includes a cylindrical tip end 26 received in a centering hole 28 in the base of the slot opening 18 and includes a center point hole 30 at its other end for simple lathe turning of concentricity including radiused side edges 32 and 34 into the part.

The side edges 32 and 34 of the centrally disposed anvil part 24 are radiused, as best shown in FIG. 2, in order to provide line contact engagement with the inserts on the nonwear surfaces along their length. This avoids the need to provide an edge wall on the anvil part matching the rake angle of the insert, whatever it may be.

The camber 22 in the radiused bottom wall of the slot opening 18 serves a like purpose with respect to the ends of the throwaway inserts 12 and 14, while the curvature 20, readily machined by corresponding cutter diameter into the bottom wall, accommodates the end clearance rake of the inserts.

With the tip end 26 of the anvil part 24 press-fit into the centering hole 28, the anvil lies close against one side of the slot opening 18 with a slight space relative to the other slot wall. It is fixed in this position by tack welds 36 at the outer end and thereby becomes integrated as a part of the one-piece shank construction.

The anvil part 24 is just slightly thinner than the cutting inserts for the tool so that when the through slot 18 is closed by the clamp screw 16, as will be described, the inserts are engaged and clamped before the slot wall closes on the center disposed anvil part.

Referring now to FIG. 3, the anvil part 24 is shown to include a hole 38 for the clamp screw 16 to pass through without any interference.

The screw part has differential threads at its opposite ends and has threaded engagement with the tool shank on only one side as at 40, of the insert receptive slot opening 18. A nut 42, only slightly larger in diameter than the screw is received in threaded engagement with its other end, in an enlarged opening 44, and a setscrew 46 is used to hold the nut against rotation in its shoulder engaged position at the bottom of opening 44.

The nut 42 provides for the high mechanical advantage of differential threading without incurring problems of assembly. When the nut is held by the set screw in adjusted position, the cross screw 16 has enough axial travel for locking the inserts without protrusion from the screw hole.

The clamp screw nut is provided with a cross-slot 50 for self-adjustment and socket holes 52 and 54 in opposite ends of the clamp screw enable its adjustment from either end.

FIG. 6 shows an alternate design for the center anvil locator, here identical as 124. It is essentially the same as locator 24. except that end wall shoulders 60 for the inserts are provided right on the anvil part. Of greater importance is the fact that the anvil part extends radially out, as at 62 and 64, under the inserts to the outer periphery of the shank where it can be tack-welded and held secure at two additional points 66 and 68. With this four-point tack-weld construction, the tip end registration for the anvil part such as element 26 in FIGS. 3 and 5 may be eliminated and other fixturing means can be used to obtain the necessary concentricity.

I claim:

1. A cutting tool comprising; a tool shank having a slot opening of substantially constant dimensions formed transversely through the terminal end thereof to provide an insert receptive recess extending to diametrically opposite sides thereof, a separable insert locator positioned centrally within said slot opening, a pair of inserts extending within said slot opening radially positioned through engagement with said locator, said locator being relatively thinner than said slot opening, and a cross screw for reducing said slot opening and clamping said inserts in said recess.

2. The cutting tool of claim 1,
said centrally positioned locator and shank including interengaging centering means at the inner end of said locator.

3. The cutting tool of claim 2,
said centering means including a locating pin and hole.

4. The cutting tool of claim 1,
said centrally positioned locator being preformed to provide end walls for the inserts and for being fixed to the tool shank at the periphery thereof.

5. The cutting tool of claim 1,
said centrally positioned locator having radiused side edges for locating engagement with side edge insert surfaces.

6. The cutting tool of claim 1,
said opening including a base curvature in said shank commensurate with the end clearance rake of the inserts to be accommodated.

7. The cutting tool of claim 1,
said cross screw having differential threads at opposite ends thereof and having threaded engagement with said shank on only one side of said opening,
a cross hole through said shank including threads on said one side,
a counterbore on said shank on the other side of said opening,
and a separately threaded member in threaded engagement with said screw and held against rotation relative to said shank on the other side of said opening within said counterbore adjusted to restrict axial travel of said screw to within the peripheral dimension of said shank in providing clamping action.

8. A cutting tool comprising;
a tool shank having a slot opening formed transversely through the terminal end thereof to provide an insert receptive recess extending to diametrically opposite sides thereof,
an insert locator positioned centrally within said slot opening,
a pair of inserts extending within said slot opening radially positioned through engagement with said locator,
said locator being relatively thinner than said slot opening,
a cross screw for reducing said slot opening and clamping said inserts in said recess,
said cross screw having differential threads at opposite ends thereof and having threaded engagement with said shank on only one side of said opening,
a cross hole through said shank including threads on said one side,
a counterbore on said shank on the other side of said opening,
and a separately threaded member in threaded engagement with said screw and held against rotation relative to said shank on the other side of said opening within said counterbore adjusted to restrict axial travel of said screw to within the peripheral dimension of said shank in providing clamping action.

9. A cutting tool comprising;
a tool shank having a slot opening formed transversely through the terminal end thereof to provide an insert receptive recess extending to diametrically opposite sides thereof,
an insert locator positioned centrally within said slot opening,
a pair of inserts extending within said slot opening radially positioned through engagement with said locator,
said locator being relatively thinner than said slot opening,
a cross screw for reducing said slot opening and clamping said inserts in said recess,
said cross screw having differential threads at opposite ends thereof and having threaded engagement with said shank on only one side of said opening,
a crosshole through said shank including threads on said one side, and
a separately threaded member in threaded engagement with said screw and held against rotation relative to said shank on the other side of said opening adjusted to restrict axial travel of said screw to within the effective cutting configuration in providing clamping action.

* * * * *